United States Patent [19]

Bohne et al.

[11] Patent Number: 5,550,453
[45] Date of Patent: Aug. 27, 1996

[54] BATTERY CHARGING METHOD AND APPARATUS

[75] Inventors: William C. Bohne, Elgin; Eric A. Bergquist, Hinsdale, both of Ill.

[73] Assignee: Motorola, Inc., Schaumburg, Ill.

[21] Appl. No.: 185,344

[22] Filed: Jan. 24, 1994

[51] Int. Cl.$^6$ .................................................... H01M 10/44
[52] U.S. Cl. ................... 320/22; 320/31; 320/35
[58] Field of Search ...................... 320/20, 22, 23, 320/31, 32, 39, 40, 35

[56] References Cited

U.S. PATENT DOCUMENTS

| | | | |
|---|---|---|---|
| 3,852,652 | 12/1974 | Jasinski | 320/35 |
| 4,503,378 | 3/1985 | Jones et al. | 320/20 |
| 4,746,854 | 5/1988 | Baker et al. | 320/40 |
| 4,806,840 | 2/1989 | Alexander et al. | 320/20 |
| 4,952,861 | 8/1990 | Horn | 320/23 |
| 5,329,219 | 7/1994 | Garrett | 320/22 |
| 5,331,268 | 7/1994 | Patino et al. | 320/20 |
| 5,365,160 | 11/1994 | Leppo et al. | 320/22 |

OTHER PUBLICATIONS

Benchmarq Dec. 1992; Using the bq2003 to Control Fast Charge.
ICS, ICS1700 Preliminary Data Sheet, Rapid Charge Controller for Nickel–Cadmiium Batteries.
Teledyne Components TC675, TC676 Fast NiCAD/Ni–Hydride Battery Charger.
EE Times/Product File Reader Service No. 516, EnChip, Inc. "The Enstore Charging System w/the ECS II–IC".
S/N 08/129,938 Goedken et al. Fast Battery Charging Method and Apparatus with Temperature Gradient Detection. (CE00771R).

Primary Examiner—Robert Nappi
Attorney, Agent, or Firm—Philip Melamed; Kenneth M. Massaroni; Scott M. Garrett

[57] ABSTRACT

In a method and apparatus for battery charging, a battery charger (20) charges a battery (11), preferably in a battery pack (10), by providing an initial battery charging current ($I_1$) and terminating the initial charging current at a time $t_2$ in response to a measured battery condition (for example, battery temperature rate of change; Delta T/Delta t) exceeding a limit. A battery parameter, preferably battery voltage, is measured at the time $t_2$ and stored as a limit ($V_{peak}$). After $t_2$, battery charging current is provided in accordance with a predetermined criteria and battery charging current is altered (to $I_3$; or to $I_1$) in response to comparing a measured battery parameter, preferably battery voltage, after $t_2$ to a threshold ($V_{peak}$; or $V_{peak}$–Delta V) based on the stored limit ($V_{peak}$). Preferably, rapid battery charging is implemented in response to a comparison of a measured battery parameter, preferably battery voltage, after the time $t_2$ with respect to a threshold ($V_{peak}$–Delta V) determined in accordance with the stored limit ($V_{peak}$).

5 Claims, 3 Drawing Sheets

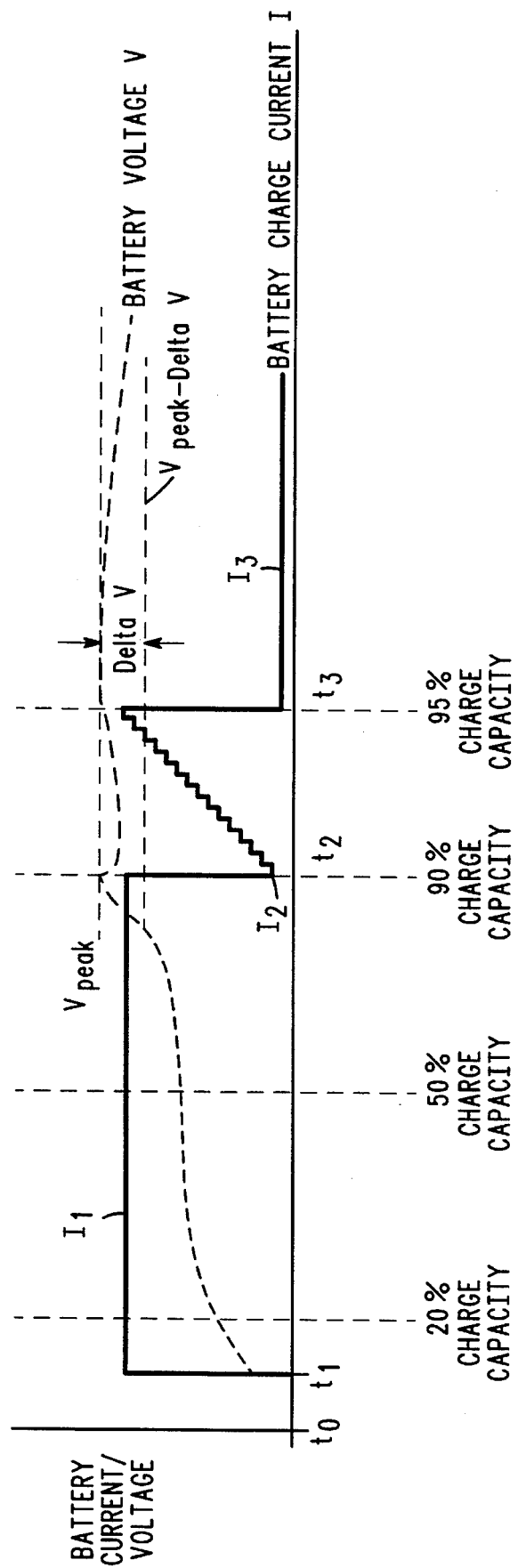

BATTERY CHARGING METHOD AND APPARATUS

FIELD OF THE INVENTION

The present invention relates to the field of battery charging methods and apparatus. More particularly, the present invention is directed to providing battery charging current for charging batteries.

BACKGROUND OF THE INVENTION

Many of types of prior battery chargers exists wherein the primary objectives are not only to charge the battery but to accomplish this in a minimum amount of time without damaging the battery. Some prior art battery chargers implement an initial rapid battery charging at a high current magnitude. When a battery condition is sensed which would indicate potential damage to the battery may occur if this rapid initial charging current is maintained, the rapid charging current is terminated and a subsequent charging current is implemented. In some cases this subsequent charging current is just a maintenance charging current which compensates for any leakage or discharge from the battery. In other cases, the subsequent charging current can be a top off interim charging current which is then followed, after a predetermined time period, with a maintenance charging current.

The prior battery charging apparatus use a variety of techniques to terminate the initial charging current and implement the subsequent charging current. However, changes to the subsequent charging current in prior art systems are typically implemented after some fixed time period and/or in response to comparing battery voltage to some predetermined fixed voltage threshold. Because of this, prior systems are inefficient in that they do not account for variations in the maximum voltage that a battery can be charged to due to the age or other conditions of the battery. Thus, prior systems may attempt to over or under charge a battery because they assume that the battery will always want to be charged to its nominal battery voltage. The present invention attempts to overcome this by taking into account that the voltage that a battery wants to be charged to for full charging may vary with the age or condition of the battery as well as manufacturing tolerances. Thus to account for this, the present embodiment takes into account the variations in maximum full charge battery voltage which occur during the lifetime of a battery.

SUMMARY OF THE INVENTION

One embodiment of the present invention implements an improved battery charging method comprising the steps of: providing at a time $t_1$ an initial battery charging current for charging a battery; terminating at a later time $t_2$ the providing of the initial charging current in response to at least a measured battery condition exceeding a limit; measuring a battery parameter, preferably battery voltage, substantially at the time $t_2$ and storing a limit based on the measured battery parameter; after the time $t_2$, providing a subsequent battery charging current in accordance with a predetermined criteria; and altering the providing of said subsequent battery charging current in response to comparing a measured battery parameter, preferably measured battery voltage, after the time $t_2$ to a threshold based on the stored limit. Apparatus for implementing the above method is also disclosed herein. Additional details of the battery charging method and apparatus are subsequently discussed and relate to various more specific features of the present embodiment. Preferably, the altering of the subsequent charging current can result in either implementing a low maintenance charging current or a rapid charging current, as desired.

BRIEF DESCRIPTION OF THE DRAWINGS

The present invention can be better understood by reference to the drawings in which;

FIG. 3 is a graph illustrating battery voltage and battery charging current waveforms for signals provided by the apparatus shown in FIG. 1.

DESCRIPTION OF THE PREFERRED EMBODIMENTS

Generally, the present embodiment provides a method and apparatus for charging a battery in accordance with sensed battery voltage. However, while prior battery charging systems tend to rely on preset fixed voltage thresholds or fixed time periods for establishing battery charging currents, the embodiments disclosed herein rely on measuring battery charging voltage at a transition time between an initial rapid battery charging current and a subsequent battery charging current. The battery voltage measured at this transition time is then utilized to control the subsequent battery charging and thereby make the present battery charging apparatus more adaptive to changes in the nominal maximum charge battery voltage which may occur due to the aging of the battery or differences in the nominal maximum charge battery voltage due to battery manufacturing tolerances. Thus a more efficient battery charging apparatus is provided by setting battery charging thresholds for control of the battery charging in accordance with a measured battery parameter corresponding to actual measured battery voltage.

Figure 1:
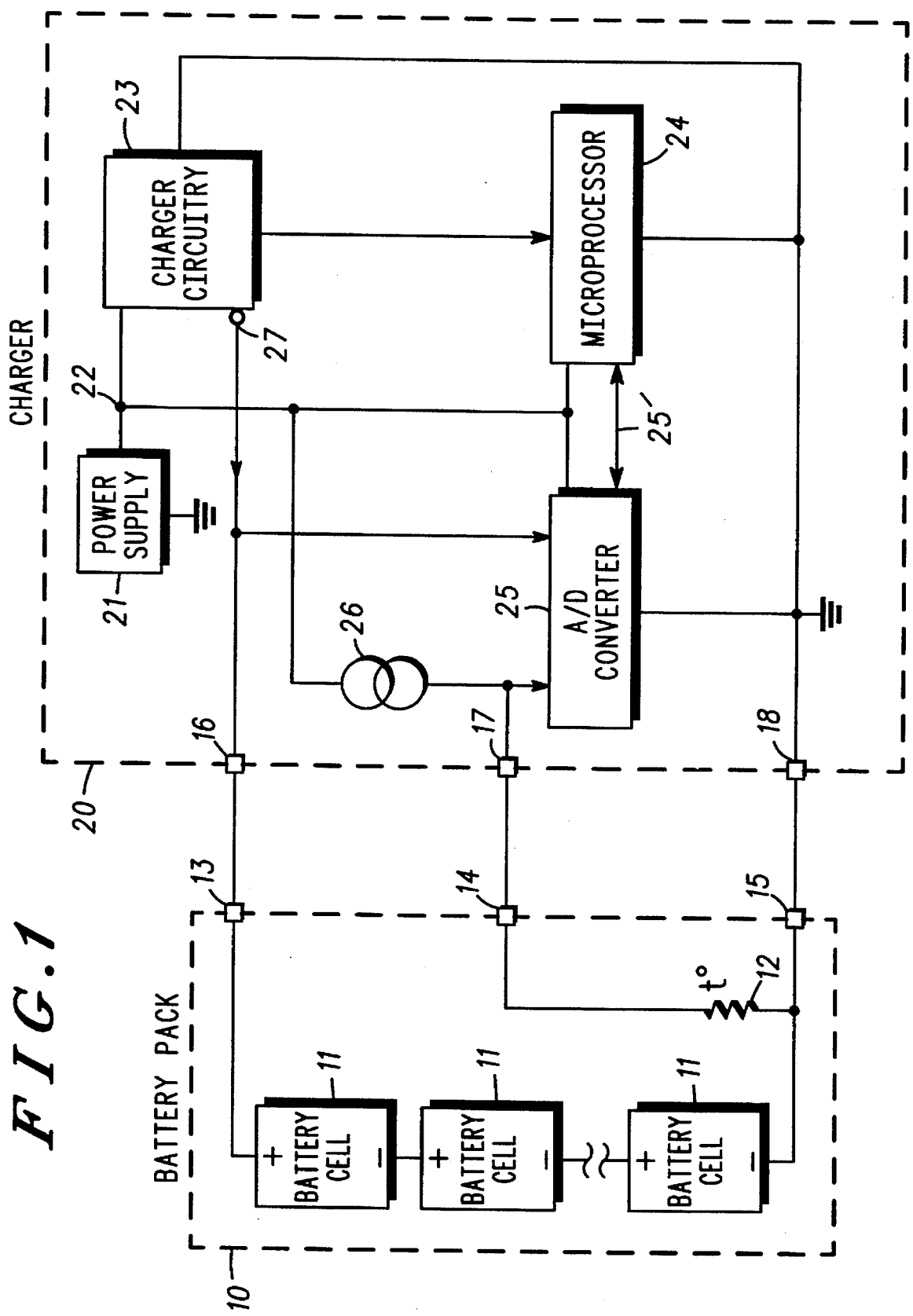
FIG. 1 is a schematic diagram of a battery charging apparatus constructed in accordance with the present invention.

The present invention can be more fully described with reference to FIGS. 1–3. FIG. 1 illustrates a schematic block diagram of a battery-pack 10 which is to be charged by a battery charger apparatus 20. The battery pack 10 comprises a number of series connected individual battery cells 11, a battery temperature sensing thermistor 12 and battery pack output terminals 13, 14 and 15. The thermistor senses battery temperature and provides a related output at the terminal 14, and battery output voltage is provided across terminals 13 and 15.

The battery charger 20 comprises a power supply 21 having an output at a terminal 22, charger circuitry 23 which will provide a charging current to the battery at a terminal 27 connected to an output 16 of the charger, a current source 26 to provide a current through the thermistor 12 so as to provide a representative temperature signal at a terminal 17 of the charger, an analog to digital converter 25 and a microprocessor 24 programmed to implement battery charging in accordance with the present invention. A ground terminal 18 of the charger provides a ground reference to the components 21, 23, 24 and 25, and the terminals 16–18 of the charger are connected to the terminals 13–15 of the battery pack 10, respectively.

Essentially, the current source 26 provides a current through the thermistor 12 which in turn thereby provides a signal at the terminal 17 indicative of the temperature of the battery cells 11 as measured by the thermistor 12. Preferably the current source 26 comprises a resistor and the power supply 21 maintains a constant reference voltage at the terminal 22. The signal at the terminal 17 provides one input to the analog to digital converter 25 and an additional battery voltage sense input also is provided to the converter 25 from the input terminal 16. The converter 25 provides, via a connection 25', signals to the microprocessor 24 which are indicative of the temperature of the battery cells 11 and the battery voltage present across the terminals 13–15. In accordance with these two sensed battery parameters, the microprocessor 24 implements battery charging and results in the charger circuitry 23 providing suitable battery charging current at the terminal 27 for charging the battery pack 10. The manner in which this is accomplished will now be discussed in connection with FIGS. 2 and 3. FIG. 2 is a flowchart illustrating the operation of the apparatus in FIG. 1 and the programming of microprocessor 24. FIG. 3 illustrates waveforms for the resultant battery voltage and battery charging current provided by the present embodiment. The waveforms shown in FIG. 3 are for the charging of a typical nickel based battery with the battery voltage V being as measured at the terminal 13 with respect to ground at the terminal 15 and the battery charging current I being provided by the charger 20 at the terminal 16.

Figure 2:
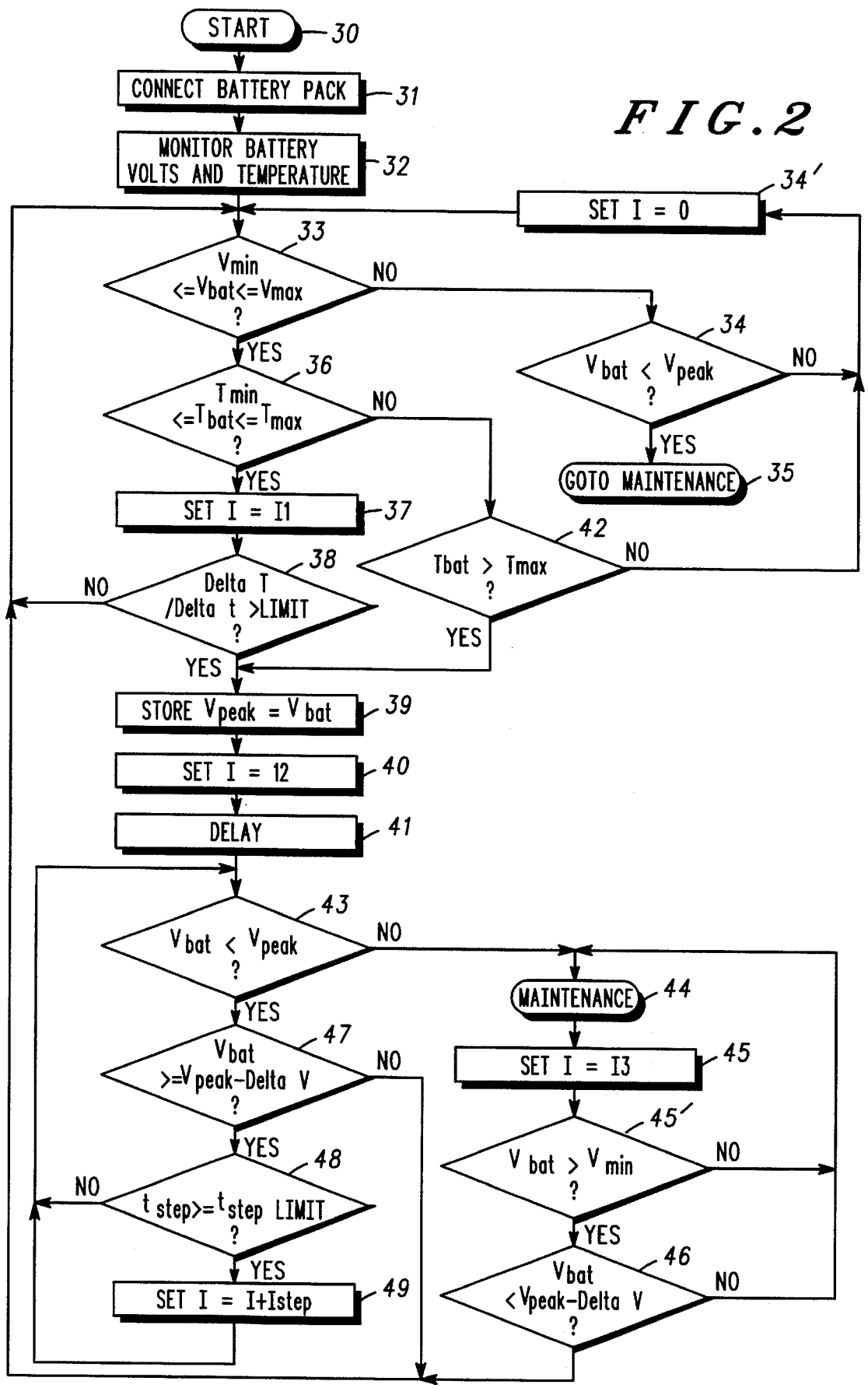
FIG. 2 is a flowchart illustrating the operation of the battery charging apparatus shown in FIG. 1.

Referring now to FIG. 2, a flowchart is illustrated which starts at an initial entry step 30 and proceeds to process steps 31 and 32. Step 31 is indicative of connecting the battery pack 10 to the charger 20 by mating the battery pack terminals 13–15 to the charger terminals 16–18. Step 32 represents the measurement of the voltage of battery pack 10 present across terminals 13 and 15 and the current source 26 providing a current through the thermistor 12 such that the voltage at the terminals 14 and 17 is now representative of the temperature of the battery due to the variable resistance of the thermistor 12 varying in accordance with battery temperature. Step 32 also sets an initial value for a variable $V_{peak}$.

At a decision step 33, the microprocessor 24 determines if the measured battery voltage $V_{bat}$ at the terminal 16 is within maximum and minimum voltage threshold levels $V_{max}$ and $V_{min}$ stored within the microprocessor 20. If so, then a decision block 36 will make a similar determination with regard to the battery temperature $T_{bat}$ with respect to stored temperature threshold limits $T_{max}$ and $T_{min}$. If the battery voltage is not within the range tested for by process step 33, control passes to a decision block 34 which inquires if the battery voltage is below the minimum battery threshold voltage $V_{min}$. If so, only a small maintenance or trickle charge current will be applied and thus a step 35 results in jumping to a subsequent step 44 for the application of such a minimum charging current. This will be explained in more detail subsequently. If the decision block 34 determines that battery voltage is not less than the minimum charging voltage threshold $V_{min}$ then control passes back again to the decision block 33 through a process block 34' which sets the charge current I to zero. The function of the decision block 34 is just to ensure that battery charging at a rapid or even moderate rate will only occur when battery voltage is within predetermined threshold limits.

Similarly, the decision block 36 will ensure that rapid battery charging is only permitted if the battery temperature is within desired maximum and minimum threshold limits. If not, control passes from decision block 36 to decision block 42 which asks if battery temperature exceeds the maximum allowable battery temperature. If not, then the battery is too cold to allow any charging and control will pass to the decision block 33 through block 34' and recirculate until a proper battery voltage and battery temperature is achieved. If decision block 42 determines that battery temperature is above the maximum temperature Tmax, control then passes to a step 39 which stores a variable $V_{peak}$. This step will be described subsequently.

If the decision blocks 33 and 36 determine that the battery voltage and battery temperature are within allowable limits, control passes to a process step 37 that will implement rapid battery charging by setting the charging current I to a constant magnitude rapid charging current level $I_1$. This is illustrated in FIG. 3 by having a solid line battery charging current waveform implement a step function at a time $t_1$ to increase battery charging current from 0 to the $I_1$ level.

Referring to FIG. 3, the solid line waveform shown therein represents battery charging current I provided by the charger 20 and the dashed waveform shown therein is representative of battery voltage V provided between the terminals 13 and 15. At the time $t_1$, the process block 37 implements the rapid charging current $I_1$ and battery voltage starts to increase due to this rapid charging current. The horizontal axis in FIG. 3 is representative of time and the vertical axis is representative of amplitude which represents the magnitude of the battery voltage V or the battery charging current I, as the case may be. Along the horizontal axis in FIG. 3 indications of the percentage of charge capacity are illustrated which approximate the achievement of charge capacity as implemented by the present embodiment.

After the process block 37, control passes to the decision block 38 which inquires, for example, if the rate of change of battery temperature T as a function of time t (Delta T/Delta t) exceeds some prestored limit value stored in the microprocessor 24. The essence of process block 38 is to determine when an excessively rapid increase in temperature is sensed so as to determine that the rapid battery charging at level $I_1$ should be terminated and that a much more moderate or interim top off charge should be implemented. Other prior systems have also utilized a detection of a rate of increase of temperature of the battery as a measured battery condition which, if it exceeds a prestored limit, should result in the termination of the initial rapid battery charging. Rather than relying on a rate of change of battery temperature, other or additional measured battery condition criteria could be utilized such as the rate of change of battery voltage equals zero or the battery temperature has reached a predetermined value. In fact, preferably step 38 not only monitors the rate of change of battery temperature, but also the second time derivative of battery temperature as taught in copending U.S. patent application Ser. No. 08/129,938, filed Sep. 30, 1993, entitled, "Fast Battery Charging Method and Apparatus with Temperature Acceleration Detection", and assigned to the same assignee as the present invention.

If decision block 38 indicates that the prestored limit has not been exceeded, then rapid battery charging just continues at the constant magnitude $I_1$ by control recirculating back to the process step 33. However, once decision step 38 indicates that at least an excessive rate of temperature increase has been reached, for example, then process block 39 will store, as a measured battery voltage parameter $V_{peak}$, the actual measured battery voltage $V_{bat}$ at substantially this time. In FIG. 3, this time is illustrated as the time $t_2$ at which approximately 90% charge capacity of the battery has been reached. Subsequently, a process block 40 now sets the charge current I to a much lower (than $I_1$) initial magnitude current $I_2$ and then a delay step 41 is implemented to allow for the settling of transient conditions. In that heat generation is a direct function of the magnitude of the applied charge current and increased heat has the effect of lowering the battery's ability to accept a charge, if termination of rapid charging is implemented pursuant to process step 42 or process step 38, the reduced charging current $I_2$ step 40 and the delay step 41 keep the temperature of the battery pack 10 from rising further and in some cases, depending on the mass of the battery, may allow the battery to cool somewhat.

From the delay step 41, control passes to a decision block 43 that asks if the battery voltage is less than the stored peak voltage $V_{peak}$. If not, this indicates that the rapid decrease in charging current has not resulted in a decrease in battery voltage even after the delay time implemented by the step 41. In such a case, it is not necessary or desirable to continue any additional interim top off charging and the charging apparatus should immediately go to implementing a maintenance charge. Thus, control passes from the block 43 to the maintenance charge entry step 44.

From the maintenance entry step 44, control passes to the process block 45 which sets the charging current $I=I_3$. $I_3$ represents a fixed magnitude trickle or maintenance charge so that the battery will be charged just enough to maintain its charge. Then control passes to a decision block 45' which asks if measured battery voltage $V_{bat}$ is greater than $V_{min}$. If not, control goes back to step 44 and the maintenance current $I_3$ continues to be applied per step 45. If block 45' determines that $V_{bat}$ is greater than $V_{min}$, than control passes to a decision block 46 which inquires if the measured battery voltage $V_{bat}$ is less than a threshold which is equal to the stored value of $V_{peak}$ minus some designated voltage offset specified as Delta V. The level $V_{peak}$ –Delta V is shown in FIG. 3 and merely represents some offset from the stored peak value which is implemented by subtracting a specified voltage level Delta V from the measured and stored peak voltage $V_{peak}$. If decision block 46 determines that no decrease in battery voltage below this specified level has occurred, then the maintenance or trickle current $I_3$ will be maintained per the steps 44 and 45. The current $I_3$ has a magnitude much less than $I_1$.

If the decision block 46 determines that the battery voltage has dropped below $V_{peak}$–Delta V, as would occur if the battery were subsequently additionally loaded or the battery was substantially at the end of its charge life, then rapid charging is reimplemented. This rapid charging occurs since control under a yes determination from the block 46 results in re-entering the decision step 33 and, in accordance with steps 33, 36 and 37, implementing the rapid charge current $I_1$ which typically is much larger than the magnitude $I_3$ or the initial magnitude $I_2$. It should be noted that this reimplementing of the rapid charging current $I_1$ is done in accordance with a voltage threshold ($V_{peak}$–Delta V) determined in accordance with the stored measured battery voltage ($V_{peak}$) that was measured at the time $t_2$. Thus the determination made by the decision block 46 is adaptive in that for any battery that is charged a measured and stored actual battery parameter, such as battery voltage, will be used to determine a subsequent reimplementing threshold for rapid battery charging current. It should also be noted that FIG. 3 illustrates the operation of the flowchart in FIG. 2 for a negative determination being made by the decision block 46.

The implementing of the maintenance or trickle current $I_3$ by the steps 44–46 occurs when the decision block 43 determines that the battery voltage $V_{bat}$ is not less than the stored peak battery voltage $V_{peak}$. If an opposite determination is made, control passes from the decision block 43 to a decision block 47 which inquires if the battery voltage $V_{bat}$ is equal or greater than the level $V_{peak}$ minus Delta V. If not, this determination indicates that a very low voltage of the battery is still present and that therefore rapid charging via the steps 33, 36 and 37 should again commence, and the flowchart in FIG. 2 illustrates this. If battery voltage is below $V_{peak}$ as determined by block 43, but above the level $V_{peak}$ minus Delta V as determined by decision block 47, control passes to a decision step 48 which is essentially an elapsed time step. Block 48 inquires if a current time step $t_{step}$ is equal or greater to a stored time step limit $t_{step}$ Limit. If not, control recirculates to decision block 43 and during this recirculation the charging current I remains at its previous level. If the decision block 48 determines that a time step has now exceeded the step limit, control passes to a process block 49 which now sets the charging current I at the previous charging current level I plus an incremental step of current equal to $I_{step}$. Then control recirculates to the decision block 43.

The operation of the decision block 48 and process block 49 is essentially to implement a staircase waveform, between $t_2$ and $t_3$, of time increasing battery charging current I with the current being maintained at its previous level for a time duration equal to $t_{Step}$ Limit. This is illustrated in FIG. 3. The decision block 48 is merely a counter or other type of elapsed time mechanism implemented by the microprocessor 24. The $t_{Step}$ Limit determines the horizontal portion of any step in the staircase waveform shown in FIG. 3 and the vertical portion of any step is determined by the magnitude of $I_{step}$.

FIG. 3 illustrates the typical battery voltage and charging current waveforms for charging a nickel based rechargeable battery. In such a situation, a rapid charging current is implemented between the times $t_1$ and $t_2$. The transition which occurs at the time $t_2$ is because at that time the rate of temperature increase (for example) of the battery, as determined by the decision block 38, has now exceeded some prestored limit. At that time, the actual existing battery voltage is measured and stored as $V_{peak}$. Then a much lower magnitude initial charging current $I_2$ is implemented which has a magnitude substantially less than the magnitude $I_1$ of the rapid charging which occurred during the times $t_1$ to $t_2$. After the time $t_2$, a subsequent charging current is increased in magnitude, preferably in a staircase manner as shown by steps 48 and 49 in the flowchart, until decision block 43 notes that the battery voltage is now equal to the previously stored measured battery voltage $V_{peak}$ which per decision block 43 now forms a voltage threshold limit. When this occurs, at a time $t_3$ in FIG. 3, then a trickle or maintenance battery charging current $I_3$ will be implemented after the time $t_3$ by the blocks 44–46 in FIG. 2. If at any time after the time $t_2$, battery voltage falls below the threshold $V_{peak}$ minus Delta V, then rapid battery charging at $I_1$ will be reimplemented by a re-execution of the rapid battery charging block 37. The rapid charging level $I_1$ is typically substantially higher than the charging current level after $t_2$ that immediately preceded it.

What has been described so far illustrates how the present embodiment utilizes a measured and stored battery voltage level $V_{peak}$ to create a threshold, either $V_{peak}$ or $V_{peak}$ minus Delta V, which is used to control the subsequent charging of the battery after $t_2$. This allows the embodiment of the present invention to implement adaptive battery charging since the value $V_{peak}$ corresponds to measured battery voltage which occurs at a measured battery condition (excessive rate of temperature rise, for example) that occurred during rapid battery charging. This allows the present embodiment to account for changes or differences in nominal battery voltage due to aging or manufacturing tolerance. This is because the value of $V_{peak}$ will vary in accordance with battery age or battery manufacturing tolerance so as to shift the battery voltage curve V shown in FIG. 3 either up or down while maintaining its general time varying characteristics. Because of this, the present embodiment accounts for battery aging or battery manufacturing tolerances in a manner not suggested by the prior art and therefore results in a much more adaptive and efficient battery charging.

While we have shown and described specific embodiments of this invention, further modifications and improvements will occur to those skilled in the art. Some such modifications could comprise terminating the rapid battery charging current $I_1$ in accordance with some criteria other than a rate of change of battery temperature or implementing a non-staircase increase in charging current during the interim or top off charging period between the times $t_2$ and $t_3$. All such modifications which retain the basic underlying principles disclosed and claimed herein are within the scope of this invention.

We claim:

1. A method of charging a battery, said battery having a battery voltage, said method comprising the steps of:

providing an initial battery charge current to said battery;

measuring a rate of temperature rise of said battery;

measuring said battery voltage when said rate of temperature rise reaches a predetermined level to obtain a $V_{peak}$ level;

after measuring said battery voltage, reducing said battery charge current substantially below that of said step of providing; and increasing said battery charge current after said step of reducing according to a predetermined staircase waveform until said battery voltage reaches said $V_{peak}$ level.

2. A method of charging a battery according to claim 1, further comprising the step of:

repeating said steps of providing, measuring a rate of temperature rise, measuring said battery voltage, and reducing, after said step of reducing if said battery voltage falls below a predetermined delta below said $V_{peak}$ level.

3. A method of charging a battery according to claim 1, further comprising the step of:

applying a maintenance charge current to said battery after said step of increasing.

4. A method of charging a battery according to claim 1, wherein said step of increasing comprises incrementally stepping up said charge current level after a predetermined time interval to provide said staircase waveform.

5. Battery charging apparatus, comprising:

means for providing an initial fast charge current to a battery, said battery having a battery voltage and a temperature;

means for measuring a rate of temperature rise of said battery;

means for measuring said battery voltage when said rate of temperature rise reaches a predetermined level to obtain a $V_{peak}$ level;

means for providing an increasing charge current according to a staircase waveform having an initial current level substantially lower than said initial fast charge current, and providing said increasing charge current while said battery voltage is below said $V_{peak}$ level.

* * * * *